United States Patent
Holliday et al.

(10) Patent No.: US 11,874,846 B2
(45) Date of Patent: *Jan. 16, 2024

(54) CODE LIST BUILDER

(71) Applicant: Palantir Technologies Inc., Denver, CO (US)

(72) Inventors: Joseph Holliday, Culver City, CA (US); Yichu Lin, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,809

(22) Filed: Feb. 25, 2022

(65) Prior Publication Data

US 2022/0179850 A1 Jun. 9, 2022

Related U.S. Application Data

(63) Continuation of application No. 16/433,674, filed on Jun. 6, 2019, now Pat. No. 11,269,904.

(51) Int. Cl.
*G06F 16/248* (2019.01)
*G06F 3/0482* (2013.01)
*G06F 16/23* (2019.01)

(52) U.S. Cl.
CPC .......... *G06F 16/248* (2019.01); *G06F 3/0482* (2013.01); *G06F 16/2379* (2019.01)

(58) Field of Classification Search
CPC .. G06F 16/248; G06F 3/0482; G06F 16/2379; G06F 8/34; G06F 8/38
See application file for complete search history.

(56) References Cited

U.S. PATENT DOCUMENTS

| | | | |
|---|---|---|---|
| 10,885,148 B2 * | 1/2021 | Charlot | G16H 40/20 |
| 11,269,904 B2 | 3/2022 | Holliday et al. | |
| 11,372,949 B1 * | 6/2022 | Agassi | G16H 70/00 |
| 2004/0073458 A1 * | 4/2004 | Jensen | G16H 10/60 709/201 |
| 2004/0220831 A1 * | 11/2004 | Fabricant | G16H 50/20 705/2 |
| 2009/0109239 A1 * | 4/2009 | Jain | G16H 30/40 345/630 |
| 2010/0306218 A1 * | 12/2010 | Bacon | G06Q 10/10 715/764 |
| 2012/0110016 A1 * | 5/2012 | Phillips | G06F 16/285 707/E17.014 |
| 2012/0150878 A1 * | 6/2012 | Naeymi-Rad | G16H 10/60 707/752 |

(Continued)

*Primary Examiner* — Hien L Duong
(74) *Attorney, Agent, or Firm* — Knobbe, Martens, Olson & Bear, LLP

(57) ABSTRACT

A computing system accesses one or more code lists, each including a plurality of items, each item comprising an alphanumerical machine code mapped to a human recognizable concept. The system may receive a query from a user, determine any matching and/or related items in the code lists, and generate an interactive visualization of the matching items. The visualization allows the user to view and detect relationships between items from multiple code lists in a manner that is not possible through review of the lists separately. The user can select nodes in a tree structured visualization to initiate addition of the corresponding alphanumerical machine codes to a custom code list.

8 Claims, 7 Drawing Sheets

(56) References Cited

U.S. PATENT DOCUMENTS

| | | | | |
|---|---|---|---|---|
| 2012/0179696 A1* | 7/2012 | Charlot | ................... | G06F 16/36 |
| | | | | 707/750 |
| 2014/0372148 A1* | 12/2014 | Reddy | ................... | G06Q 50/22 |
| | | | | 705/3 |
| 2015/0039176 A1* | 2/2015 | Fish | ....................... | G07C 5/008 |
| | | | | 701/31.6 |
| 2015/0058317 A1* | 2/2015 | Charlot | ................ | G06F 16/248 |
| | | | | 707/722 |
| 2016/0019356 A1* | 1/2016 | Martin | ................... | G16B 50/00 |
| | | | | 705/2 |
| 2016/0217256 A1* | 7/2016 | Kim | ....................... | G16H 10/60 |
| 2016/0283656 A1* | 9/2016 | Charlot | ................ | G16H 50/50 |
| 2016/0283673 A1* | 9/2016 | Charlot | ............ | G06F 16/24573 |
| 2017/0212990 A1* | 7/2017 | Cardwell | ............ | G06F 16/2468 |
| 2018/0357381 A1* | 12/2018 | Aldin | ..................... | G16H 10/60 |
| 2018/0374571 A1* | 12/2018 | Garner | ................... | G16H 10/60 |

* cited by examiner

CODE LIST BUILDER

TECHNICAL FIELD

The present disclosure relates to user interfaces and workflows for building custom code lists, such as from multiple code lists having different machine codes.

BACKGROUND

Machine code is often used to identify human recognizable concepts, such as products, services, conditions, diagnoses, etc. For example, machine code, such as a string of alphanumeric characters (e.g., 253.5), may be used to identify a particular medical condition (e.g., diabetes insipidus). Thus, that machine code may be used in place of the medical condition, such as in records of patients that have been diagnosed with diabetes insipidus. Patient (or other) records may be searched using the code (253.5) to identify records of patients associated with diabetes insipidus. However, certain items, such as medical diagnoses, may be associated with many machine codes within a single code list, such as different variations of a medical diagnoses. Additionally, different code list, such as different medical diagnosis code lists, use different machine codes to represent the same medical diagnosis.

SUMMARY

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In one embodiment, a computerized method is performed by a computing system having one or more hardware computer processors and one or more non-transitory computer readable storage device storing software instructions executable by the computing system. The computerized method may include accessing a code list including a plurality of items, each item comprising an alphanumerical machine code mapped to a human recognizable concept, receiving a query from a user, determining one or more matching items of the plurality of items that match the query, updating the matching items to include one or more related items, determining relationships between respective matching items, generating an interactive user interface including a visualization of the matching items, the visualization including nodes representing the matching items and edges representing relationships between the matching items, receiving selection of one or more nodes in the visualization indicating matching items for inclusion in a custom code list, and generating the custom code list including at least the alphanumeric machine codes mapped to the selected one or more nodes.

In some embodiments, the method may further include exporting the custom code list, wherein the custom code list is usable to identify records in a third-party database associated with any of the matching items in the custom code list.

In some embodiments, the method may further include receiving a second query from the user, determining a second one or more matching items of the plurality of items that match the second query, updating the second matching items to include one or more second related items, determining second relationships between respective second matching items, generating a second visualization of the second matching items, the second visualization including second nodes representing the second matching items and second edges representing second relationships between the second matching items, and receiving selection of a second one or more nodes in the second visualization indicating second matching items for inclusion in the custom code list, wherein the second matching items are combined with the first matching items in the custom code list prior to exporting the custom code list.

In some embodiments, the alphanumerical machine codes represent medical diagnosis codes or drug codes. In some embodiments, relationships indicate different alphanumerical machine codes that are each mapped to a same or similar human recognizable concept. In some embodiments, the interactive user interface further includes a listing of at least some of the one or more matched items. In some embodiments, the interactive user interface includes a selectable component that, in response to selection by a user, initiates addition of one or more of the matched items that are selected in the listing. In some embodiments, the interactive user interface further comprises controls to add nodes to the visualization and remove nodes from the visualization. In some embodiments, the interactive user interface further comprises a control to add a selected subset of nodes to the custom code list.

In one embodiment, a computerized method is performed by a computing system having one or more hardware computer processors and one or more non-transitory computer readable storage device storing software instructions executable by the computing system. The method may include receiving selection of at least a first code list and a second code list from a plurality of code lists, each of the code lists comprising alphanumerical machine codes mapped to human recognizable concepts, receiving a query from a user, determining one or more matching items of a plurality of items in the first code list and the second code list that match the query, updating the matching items to include one or more related items, determining relationships between respective matching items, generating an interactive user interface including a visualization of the matching items, the visualization including nodes representing the matching items and edges representing relationships between the matching items, receiving selection of one or more nodes in the visualization indicating matching items for inclusion in a custom code list, and including at least the alphanumeric machine codes mapped to the selected one or more nodes.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
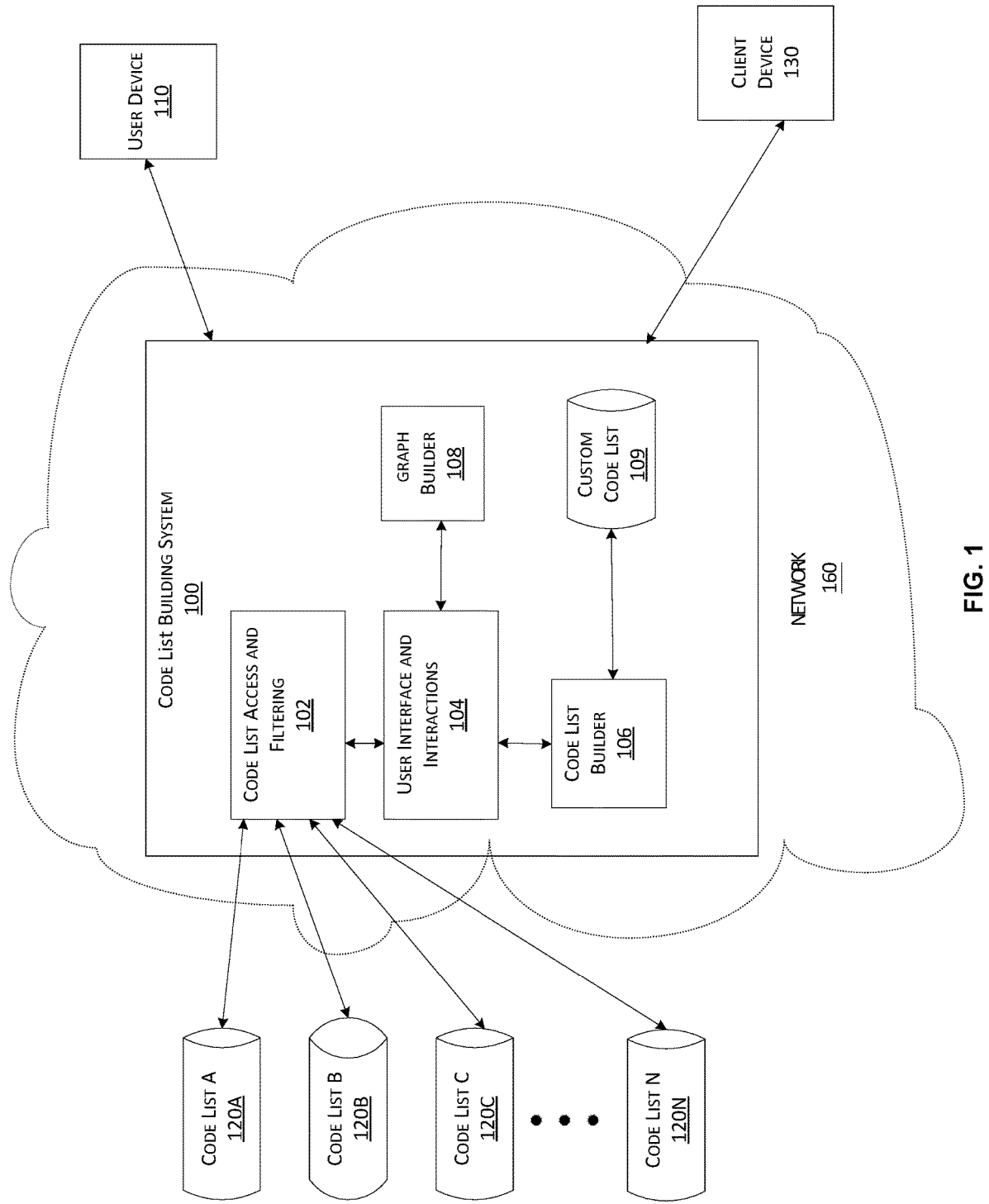
FIG. 1 illustrates one embodiment of a Code List Building System in communication with multiple other devices and components.

As noted above, machine code is often used to identify human recognizable concepts, such as products, services, conditions, diagnoses, etc. In such a coding environment, certain items, such as medical diagnoses, may be associated with many machine codes within a single code list, such as different variations of a medical diagnoses. Thus, searching for a particular machine code may miss relevant records because of use of the non-exact machine code in relevant records. Additionally, multiple code lists may be used in identifying human recognizable concepts, resulting in multiple machine codes (from the corresponding multiple coding systems) being associated with a same human recognizable concept. Thus, searching for a particular machine code associated with a human recognizable concept may miss relevant search results that are associated with machine codes (for the same human recognizable concept) used in another code list.

Among other features, disclosed herein are systems and methods providing a user interface and workflow that interacts with a user to build a custom code list that has been curated by the user, such as from multiple code lists having different machine codes for the same human recognizable concept. In some embodiments, such a code list building system (or simply "system" as used herein) may have access to multiple code lists, which may represent a concept universe that includes human recognizable concepts from the multiple code lists. Thus, a concept universe may include two or more concepts from two or more code lists that are each associated with a same concept (and different machine codes). Accordingly, a concept universe may include overlapping concepts among the multiple code lists. As one example, a concept universe may include multiple code lists of medical diagnosis codes from different providers that include different machine codes for the same or similar diagnoses (and/or other medical items). For example, the system may have access to an ICD-9 code list and an ICD-10 code list, as well as a listing of relationships between certain ICD-9 codes and ICD-10 codes. The user interface allows the user to search and/or otherwise filter through the available code lists and displays the filtered codes. The filtered codes may be selected for display in a graph panel of the UI, which in one embodiment illustrates each code as a node and relationships between the codes as edges. The UI then allows removal of certain codes displayed in the graph or addition of more codes to the graph, such as by the user selecting additional codes in the filtered list. The user may select certain codes in the graph for addition to a custom code list, or may indicate that all codes in the graph should be added to the custom code list. The user may then perform another search of the multiple code lists, such as by searching for another keyword in the human recognizable concept and/or machine code, to cause a listing of additional codes to be displayed. These additional codes may then be selected for display in an updated graph in the UI, which then allows nodes (and associated codes) to be selected for addition to the filtered list. As additional codes are added to the filtered list, such as in response to multiple iterations of searching and filtering performed by the user, the custom code list expands to incorporate each of the codes. The custom code list may be exported in various formats that are usable, for example, to identify records in a database having any of the codes in the custom code list.

Terms

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Application Programming Interfaces (APIs): an API is generally a defined communication channel, protocol, settings, etc. that allows two devices to exchange information between one another in a more direct manner than might otherwise be possible. In some embodiments, an API registration module may be configured to register individual devices (e.g. computing devices, Internet of things devices, sensors, etc.) for communication with a particular computing device (e.g., a central server that receives, processes, stores, provides, information to the individual devices) by issuing a token to the individual devices that authorizes such direct communications. Thus, a computing system may establish secure and direct communication channels with multiple devices via APIs.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Overview of Example Code List Building System

FIG. 1 illustrates one embodiment of a code list building system 100 in communication with multiple other devices and components, wherein the code list building system 100 is configured to execute software for enabling generation and use of custom code lists. The functionality described with reference to FIG. 1 may be implemented and used with any type of data, such as medical data, regulatory data, security data, insurance data, educational data, etc. Thus, while many examples herein refer to medical diagnosis data and machine codes, the systems and methods disclosed are equally applicable to other types of data and machine codes.

In the example of FIG. 1, the code list building system 100 comprises one or more computing systems, such as a server or array of servers, that execute code list builder software that interfaces with a user device 110, one more code list data stores 120 (including example code list data stores 120A, 120B, 120C, and 120N in FIG. 1). The network 160 comprises one or more networks, whether wireless or wired, such as any combination of local area networks (LANs), personal area networks (PANs), wide area networks (WANs), and the Internet. Thus, in some embodiments the code list building system 100 accesses one or more of the code list data stores 120 via a local area network, while accessing other code list data stores 120 via a secured Internet connection. Similarly, communication with the user device 110 and the client device 130 may be via a local area network or more remotely. In some embodiments, some or all of the code list building software discussed with reference to the code list building system 100 herein is stored and executed on one or more of the user device 110 and/or the client device 130. For example, in one embodiment the user device 110 may include the code list builder software that is discussed herein generally with reference to the code list building system 100.

The code list building system 100 includes a code list access and filtering component 102 configured to accesses multiple code lists from one or more data stores. For example, the code list building system 100 may access a first code list from code list data store 120A and a second code list from code list data store 120B. Each of the code lists includes a plurality of alphanumeric machine codes that are each mapped to a human recognizable concept, or in some situations to multiple human recognizable concepts. Thus, the machine codes are typically meaningless to a human operator without knowing the appropriate translation of the machine codes to their respective human recognizable concept. For example, a machine code of "0777-3105-02" may be associated with a specific prescription drug and may be indicative of additional information regarding the prescription drug, such as manufacturer, labeler, packaging, etc. However, the machine code 0777-3105-02 alone is meaningless to a human operator.

The code list building system 100 also includes a user interface and interactions component 104 configured to interface with multiple other components, devices, and systems. In the example of FIG. 1, the user interface and interactions component 104 interfaces with the user device 110 by providing user interfaces for display on the user device 110 that allow the user of the user device 110 to interact with the code list building system 100 and generating a custom code list 109. The user interface and interactions component 104 further communicates with the graph builder component 108, which generates visualizations of subsets of codes selected by a user, such as in the form of a tree structure having nodes and edges. The graph builder component 108 may generate other types and formats of visualizations in other embodiments. The graph builder component 108 provides the visualization information to the user interface and interactions component 104 for inclusion in a user interface that is provided to and displayed on the user device 110.

The user of the user device 110 is able to interact with the user interface and interactions component 104 to perform searches and various filtering operations on one or more machine code lists (e.g., via interactions with the code list access and filtering component 102) and select particular codes and/or their associated human recognizable concept for inclusion in the custom code list 109. In response to selection by the user of one or more machine codes for inclusion in the custom code list 109, the user interface and interactions component 104 communicates those codes to the code list builder 106, which creates and updates a custom code list as the user continues to select codes for addition to the custom code list 109. Further, in some embodiments the user interface provides an option for the user to remove codes from the custom code list 109, and such removal of codes is initiated by the code list builder component 106.

In one example implementation of the code list building system 100, the code list access and filtering component 102 accesses a first code list 120A and a second code list 120B, each indicating multiple combinations of alphanumeric machine codes and corresponding human recognizable concepts. For example, the first code list could include thousands of medical diagnosis codes and their associated diagnoses in a first coding system (e.g., ICD-9) while the second code list could include thousands of medical diagnosis codes and their associated diagnoses in a second coding system (e.g., ICD-10). In general, each combination of a machine code and a corresponding human recognizable concept may be referred to herein as an item. Thus, the system 100 may access thousands, millions, or more items (combinations of machine codes and human recognizable concepts) from multiple data sources.

The system 100 may then receive a query from the user device 110 and the code list access and filtering component 102 determines matching items in the accessed code list matching the user query. The code list access and filtering component 102 may also identify related items associated with the matching items, such as subcodes or parent codes of items matching the actual syntax of the user's search query, such as by reference to a known hierarchical arrangement of codes in the particular coding system. Additionally, related items for a particular matched item may include items found in a different code list. For example, a first item in a first code list may be a related item to a second code in a second code list, e.g., both are related to a particular medical diagnosis. Identification of such related items may be performed by evaluating a relationship mapping that is accessible to the system 100. A relationship mapping may include mappings between two, three, or any quantity of machine codes or items in different code lists. Such relationship mappings may be automatically generated based on textual analysis of machine codes and/or human recognizable concepts in each of the multiple code lists and/or may be generated manually. These related items may be included in the matching items that are provided in the user interface to the user.

Next, the user selects one or more items in the matched items list to initiate generation of a visualization of the selected items. For example, the user may select a first matched item in the matched items list to initiate a call to the graph builder component 108 requesting generation of a visualization of the selected first matched item and its related items. Graph builder component 108 generates a visualization, such as in a tree structure, e.g., a directed acyclic graph or a hierarchical directed acyclic graph, or any other visualization format. In some embodiments, the graph builder generates a tree structure having nodes representing machine codes and edges representing relationships between codes. For example, edges in the tree structure may represent a hierarchical relationship with a particular code, such as to indicate a subcode or a parent code. In some embodiments, details regarding a hierarchical relationship may be indicated by a particular visual effect, such as a particular color, size, pattern, etc. of the particular edge and/or associated nodes. For example, child nodes of a selected parent node may each be indicated in a certain color.

The tree structure visualization may also include relationships between items from different code lists in a concept universe that includes overlapping concepts in multiple code lists. For example, a first item of the first code list may be associated with a second item in a second code list, such as based on an automatically and/or manually generated relationship mapping. Thus, selection of a single matched item may result in a visualization that includes multiple related items and indicates relationships of those related items with the selected item and/or other related items included in the visualization. In some embodiments, the user may select multiple matched items to initiate generation of a visualization of those multiple matched items and their related items by the graph builder component 108.

The user may manipulate the matched item list, which may be a hierarchical list (or sorted by other characteristics of the matched items), and/or the visualization of any selected items to identify one or more items for addition to a custom code list. Items may be selected either from the matched item list or in the visualization (e.g., by selecting the corresponding node) to initiate addition of the selected items to the custom code list. In some embodiments, the user interface includes controls allowing the user to select one or more nodes and concurrently add all of the selected nodes to the custom code list. Additionally, in some embodiments the custom code list can be viewed and the user interface includes controls to remove items from the custom code list. The user may then perform multiple additional iterations of searching and/or filtering code lists, identifying further items for visualization, and selecting items for addition to the custom code list. Finally, the user can explore and/or save the custom code list for use by a client device 130, such as to identify records in a large data set having machine codes included in the custom code list.

Figure 2:
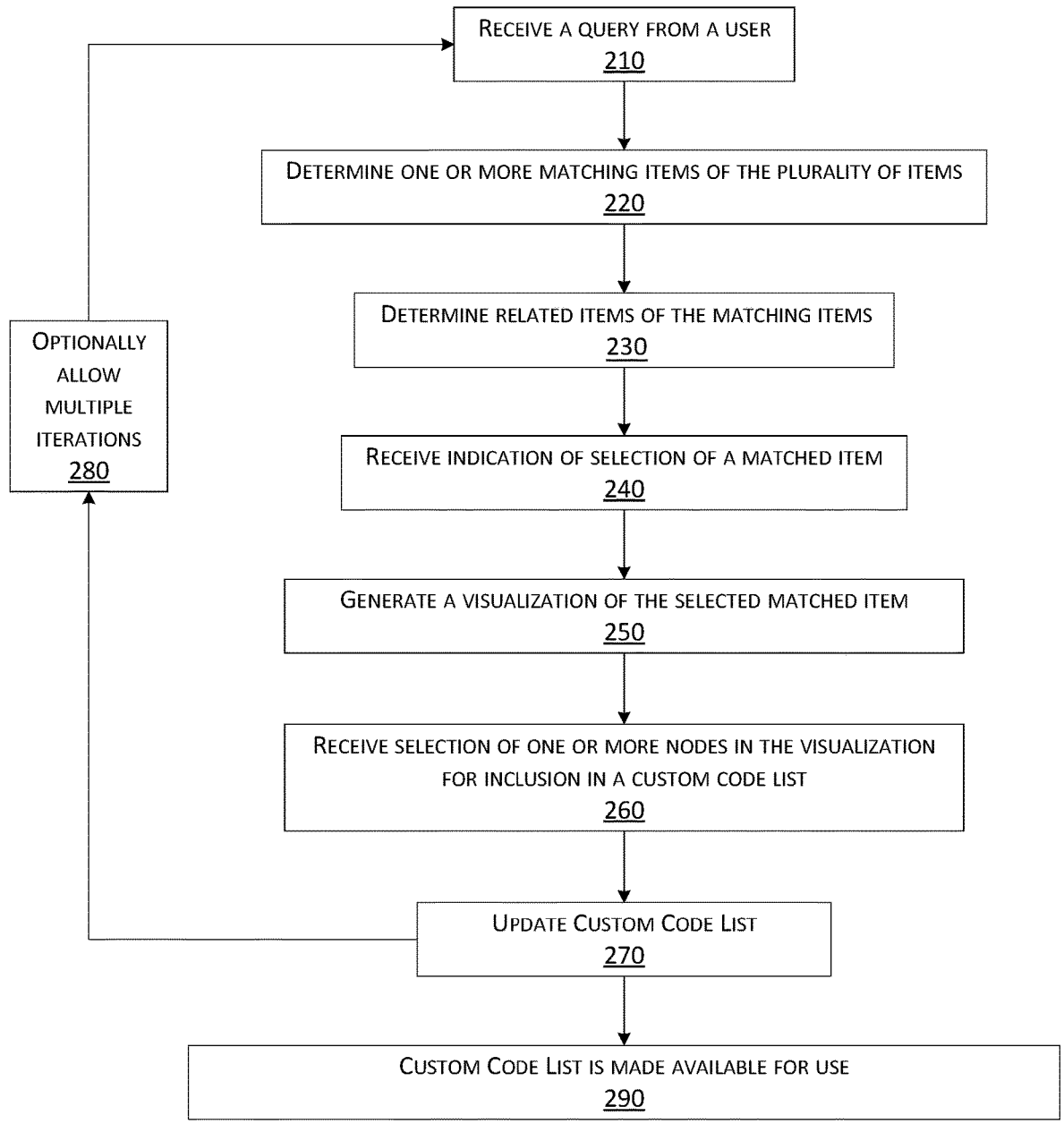
FIG. 2 is a flowchart illustrating one embodiment of a method that may be performed by code list building system discussed herein.

FIG. 2 is a flowchart illustrating one embodiment of a method that may be performed by a code list building system. Depending on the embodiment, the method of FIG. 2 may include fewer or additional blocks than illustrated and/or the blocks may be performed in an order different than illustrated. Additionally, certain of the blocks may be performed by the code list building system, while others are performed by the user device, the client device, and/or another system or device.

Beginning at block 210 the system receives a query from a user, such as via a user interface generated by code list building software. For example, if the user is searching for diagnosis codes, the searcher could query on a portion of a human recognizable concept of interest, such as "diabetes" or "cancer." In some embodiments, the user may select one or more code sets to be included in the queries, such as prior to an initial search or at any time during the iterative searching and code selection process. For example, the user could select to have three of hundreds of diagnosis code sets included in search queries. In some embodiments, the user may adjust the code sets even after a search of previously selected codes has been performed and cause the system to update the matched items (based on the same query) using the newly selected code sets.

Next, at block 220 the system identifies any matching items of the plurality of items in the selected code sets. For example, a search query of multiple code sets may match with one or more items from each of the multiple code sets.

Moving to block 230, the system determines any related items of the matching items. For example, related items for a particular matched item may include items found in a different code list. For example, a first item in a first code list may be a related item to a second item in a second code list, e.g., both machine codes are related to a particular medical diagnosis. The system may also identify other related items in the same code set as each matched item, such as based on the related items having a hierarchical relationship (perhaps within a predetermined relationship length) with the matched item.

In some embodiments, the system may identify items that are related based on one or more relationship mappings indicating relationships between items of different code sets. In some embodiments, the system may identify items that are related based on automatic analysis of items in the selected code sets, such as by performing a text comparison of the human recognizable concept in the matched items and other items. The matched items, including the determined related items in some embodiments, may then be displayed to the user in a hierarchical list format (or other format in other embodiments).

In block 240, the system receives an indication of selection of the matched item by the user and provides a visualization component, such as code list builder component 108 (FIG. 1), information regarding the selected item(s) and the determined related items, including relationships between those items.

Next, in block 250 the system generates a visualization of the selected matched item and the determined related items. For example, a tree structure including nodes and edges may be generated.

In block 260, the system receives an indication of selection of one or more nodes in the visualization. In some embodiments, selection of a node in the visualization triggers addition of the node to a custom code list. In other embodiments, the user may select one or more nodes in the visualization and then select a user interface element to add items associated with the selected nodes to the custom code list.

At block 270 a custom code list is created or updated with items selected for inclusion in the custom code list.

At block 280, the user optionally performs multiple iterations of blocks 210-270, performing different search queries and filtering operations to identify items to be added to the custom code list. The user may perform any number of such iterations. In the example of FIG. 2, each iteration ends with the custom code list being updated with any items selected for addition to the custom code list.

Next, at block 290 the custom code list is available for export and/or other uses. For example, the custom code list may be exported to another system, such as an external third-party system, for use in identifying records associated with the items in the custom code list. For example, a custom code list of medical diagnosis codes spanning multiple code lists may be used to identify patient records in a medical facilities records having any of the machine-readable codes in the included items. Depending on the embodiment, custom code lists may include one or more of the machine readable codes, their associated human recognizable concepts, relationship information regarding the machine readable codes, and/or other information regarding the included items.

Figure 3:
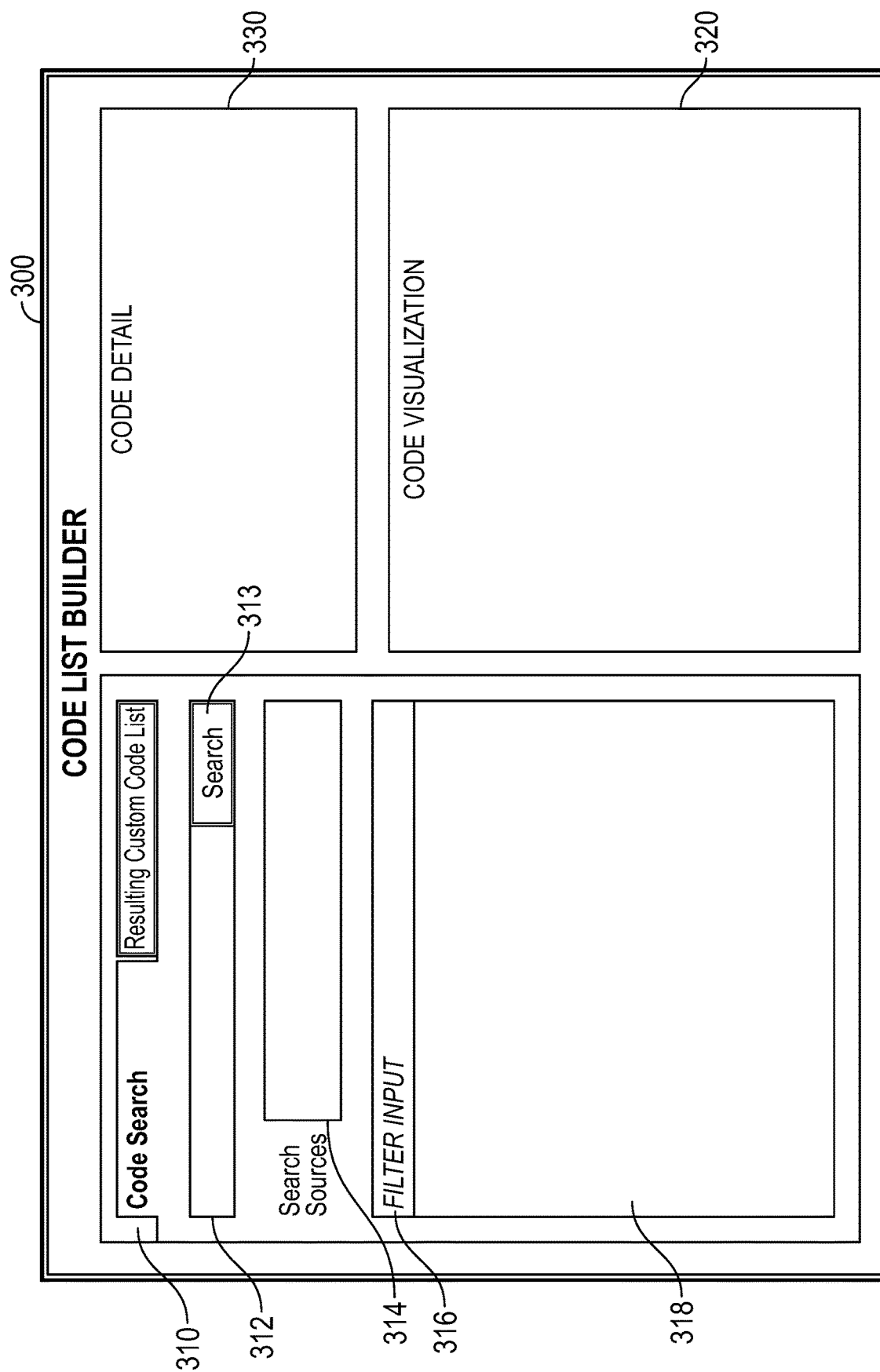
FIG. 3 is an example user interface illustrating one embodiment of a code list builder interface that may be provided to the user device.

FIG. 3 is an example user interface illustrating one embodiment of a code list builder interface that may be provided to the user device. For example, the user interface 300 may be generated by the user interface and interactions component 104 of code list building system 100 (FIG. 1) and displayed on the user device 110, such that the user of the user device 110 may interact with the user interface 300. The example user interface 300 includes a code search panel 310, a code visualization panel 320, and a code detail panel 330. In other embodiments, these panels may be separated and/or expanded upon with other panels.

The example code search panel 310 includes a search interface 312 configured to receive a search query from the user and a search sources control 314 configured to allow the user to select one or more code lists for inclusion in the search query. The search query may be executed in real-time as characters of the search query are received from the user and/or in response to selection of the search button 313 by the user. When the search is executed, matching items from any selected code lists (in search sources control 314) are identified and at least a portion of them are displayed in the match panel 318. Items in the match panel 318 may then be selected to initiate generation and display of a visualization in code visualization panel 320 and details regarding the selected item are displayed in code detail panel 330.

Figure 4:
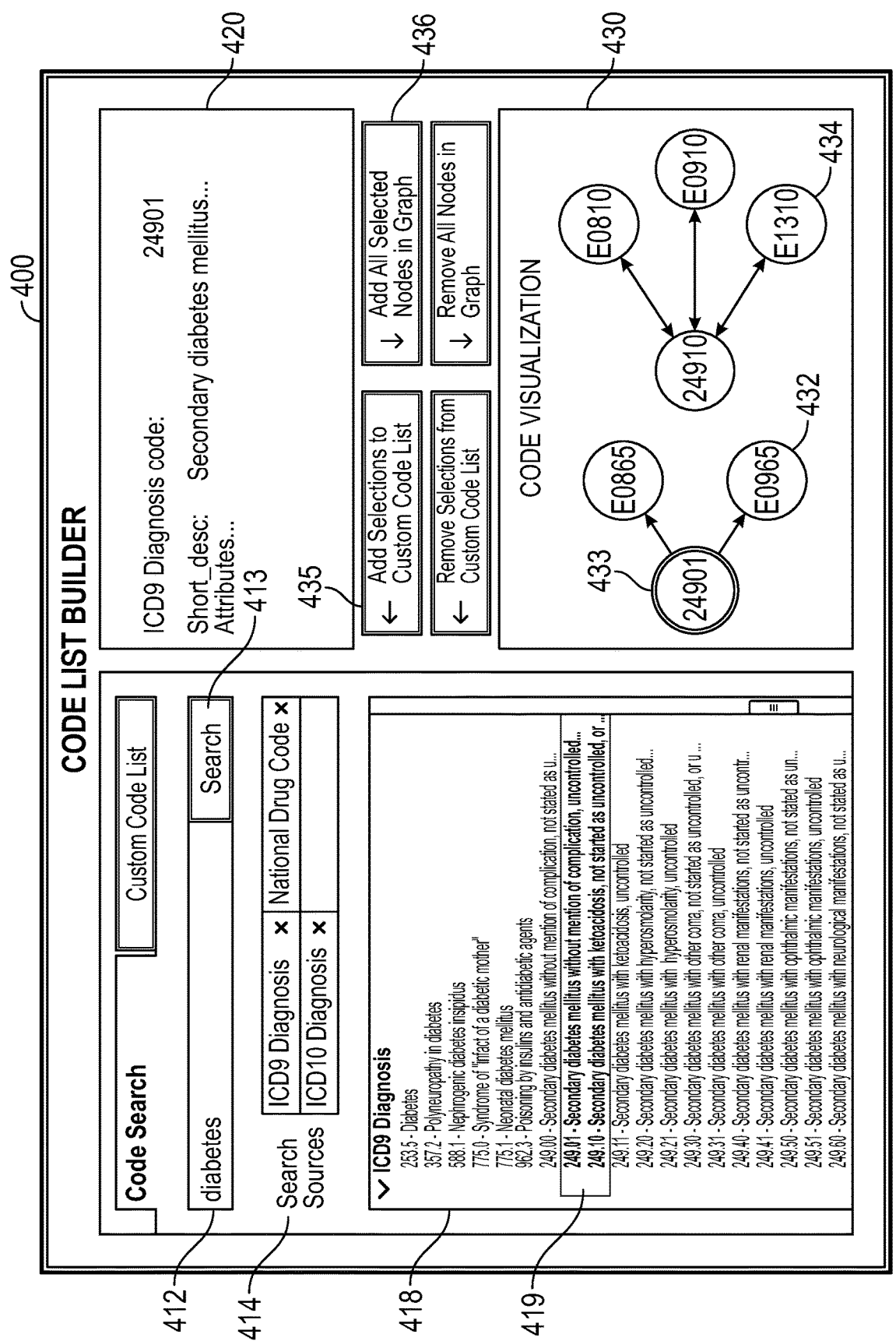
FIG. 4 is another example user interface illustrating one embodiment of a code list builder interface that may be provided to the user device.

FIG. 4 is an example user interface 400 illustrating one embodiment of a code list builder interface that may be provided to a user device. Example user interface 400 includes a search sources interface 414 configured to allow the user to identify one or more code lists within a concept universe including concepts from multiple code lists, to include in a subsequent search. In some embodiments, the user may identify code lists by beginning to type characters of a desired code list identifier, such as "ICD" to identify code lists based on an ICD standard. In response to providing a partial code list identifier, the system may provide a list of matching code list identifiers for selection by the user. The user can then select any code list to be included in the search, which will then appear in the search sources interface 414. Each of the selected code lists may also include a user interface control that allows the user to easily remove the code list from subsequent searches, such as the "x" in each of the code lists of search sources interface 414.

A search interface 412 of user interface 400 is configured to receive search queries from the user. In this example, the user has entered "diabetes" in the search query, to initiate searching of any selected code lists. The search query may be executed in real-time as characters of the search query are received from the user and/or in response to selection of the search button 413 by the user. Matching items are identified by the system and at least a portion of the items are displayed in the match panel 418. The matched items may organized into a hierarchical relationship, such as a tree structure, and/or sorted based on machine code, human recognizable concept, search relevance, and/or other characteristics. The user may then select one or more displayed items to initiate generation and display of a visualization in code visualization panel 430. In the example of FIG. 4, two matched items 419 are selected, such as by the user clicking or touching those items in the matched list. In response to the selection, the system generates one or more visualizations that are displayed in the code visualization tree structures 432 and 434 in the illustrated example. In this example, node 433, which represents machine readable code "24901", has been selected by the user so that code details are displayed in code detail window 420. The code details may include any available information related to the selected code.

In the example of FIG. 4, an add selected nodes button 436 may be selected to initiate addition of all items associated with selected nodes in the code list panel 418 to the custom code list. Thus, with node 433 selected, selection of button 436 would cause the item associated with selected node 433, e.g., including machine code "24901", to be added to the custom code list. With nodes 433 and 432 selected, the selection of button 436 would cause the machine codes "24901" and "E0965" to be added to the custom code list. If no subset of nodes is selected within visualization 430, in some embodiments the label on button 436 is updated to "add all nodes," and selection of button 436 initiates addition of all codes associated with nodes illustrated in the code visualization panel 430 to the custom code list. Thus, selection of button 436 in the user interface 400 (with no nodes selected) would cause items associated with each of the seven illustrated nodes in the code visualization panel 430 to be added to the custom code list. Similarly, add selections button 435 may be used to add codes selected in the match panel 419 to the custom code list or, when no codes are selected in the match panel 419 (and the button 435 text may update to indicate addition of all codes) to add all codes to the custom code list.

Figure 5:
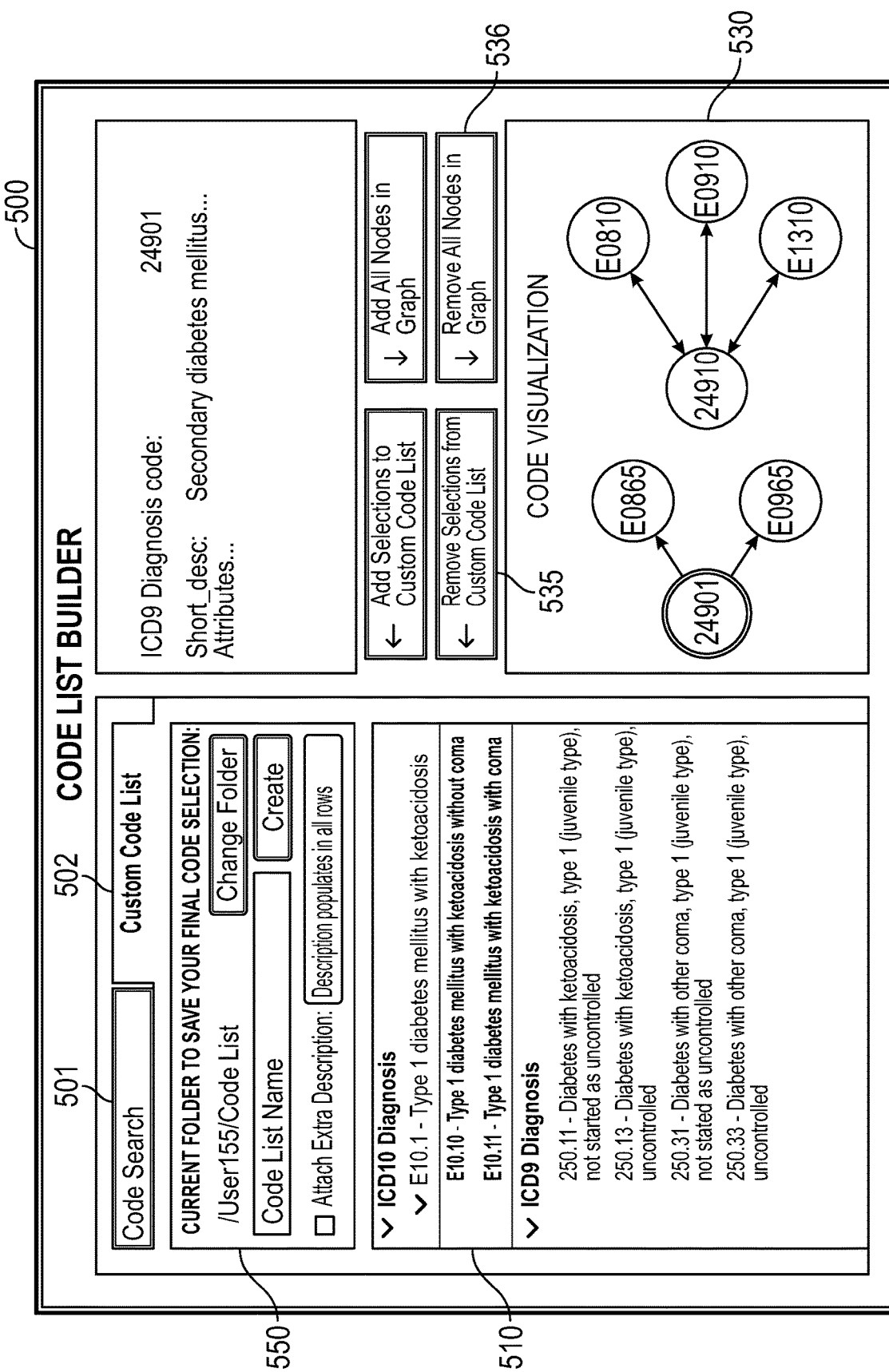
FIG. 5 is another example user interface illustrating display of a custom code list that has been generated via code list builder interfaces such as those discussed herein.

FIG. 5 is another example user interface illustrating display of a custom code list that has been generated via code list builder interfaces such as those discussed herein and illustrated in FIGS. 3 and 4. In this example, a code search panel (such as example code search panels 312 and 412) has been hidden by selection of a custom code list tab 502, which causes display of information regarding the custom code list that the user has built and/or is still in the process of building. The user may return to the code search panel by selecting code search tab 501.

User interface 500 displays a code list panel 510 that includes all of the items previously selected for addition to the custom code list by the user. In this example, the items in the custom code list are displayed in a hierarchical tree structure, sorted by their corresponding code list first and then by their codes. Thus, in the example of FIG. 5, items that were identified in an "ICD10 Diagnosis" code list are grouped together first and then items identified in an "ICD 9 Diagnosis" are grouped afterwards. Thus, the user interface provides an integrated display of items that have been identified by the user through multiple iterations of searching code lists, viewing and manipulating visualizations, and selecting codes for addition to the custom code list. With the custom code list tab 502 selected, a selected code removal button 535 may be selected to cause removal of any selected items in the code list panel 510 from the custom code list. Thus, a user may select one or more items in the custom code list and have them removed from the custom code list by selecting button 535. Similarly, the remove all nodes button 536 causes removal of all items associated with selected nodes in the visualization panel 530 from the custom code list.

The example user interface 500 also includes a file management panel 550 that allows the user to select a location for storage of the custom code list. In some embodiments, the file management panel 550 may allow the user to save and/or export the custom code list in multiple formats. In some embodiments, the code list builder software is integrated with one or more communication platforms, so that the user can initiate communication of a custom code list via any available communication mediums, such as direct application communication, FTP, email, etc.

Figure 6:
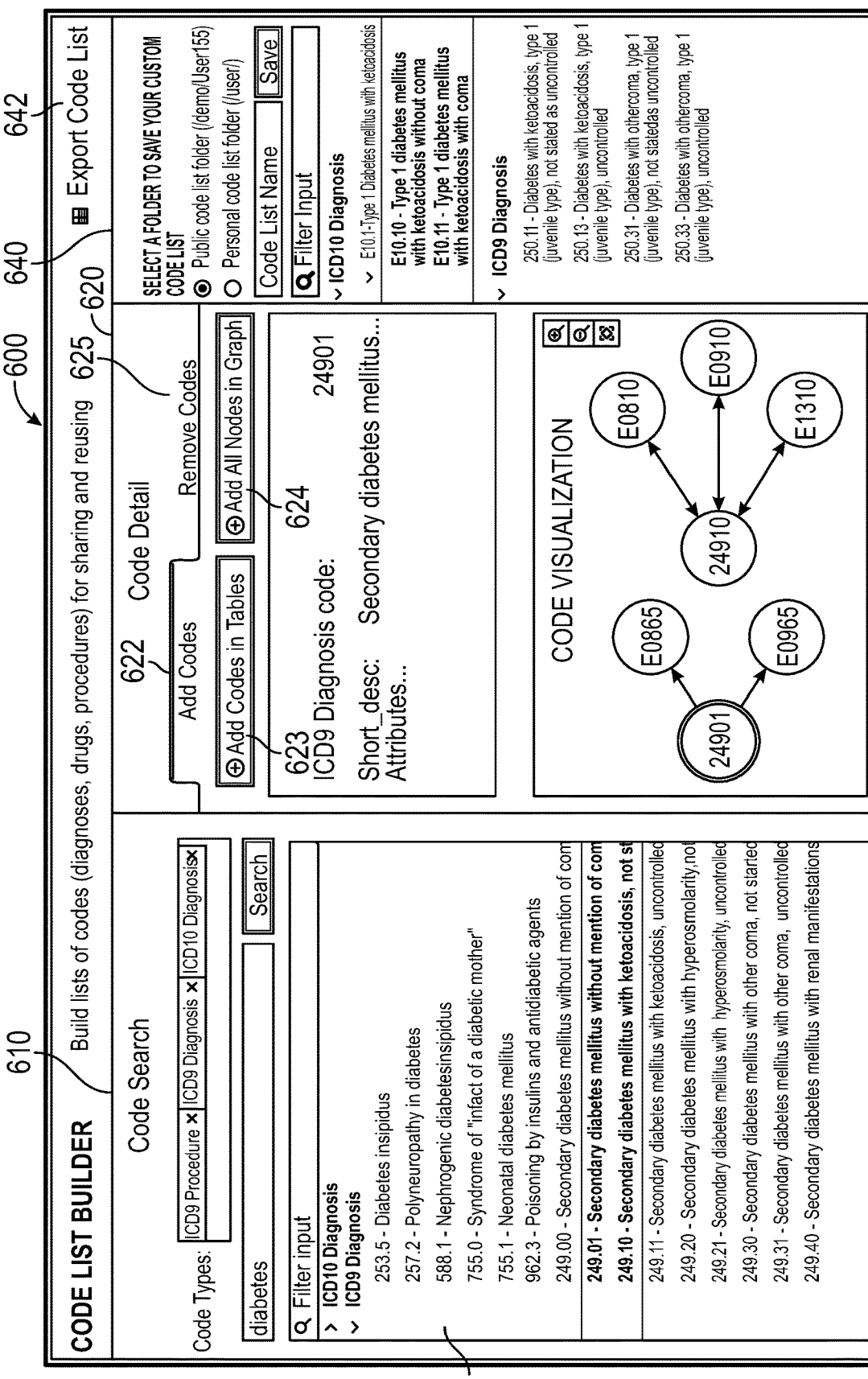
FIG. 6 is another example code list builder user interface that may be used to generate a custom code list.

FIG. 6 is another example code list builder user interface 600 that may be used to generate a custom code list. The user interface 600 includes each of a code search panel 610, a code detail panel 620, a code visualization panel 630, and a custom code list panel 640. Thus, in this embodiment, the resultant custom code list is displayed in panel 640 as the user searches and filters through items in panel 610 and selects items in the code list panel 610 or the code visualization panel 630 for addition to the custom code list. Accordingly, the user interface 600 provides a real-time view of the custom code list. In this embodiment, the code detail panel 620 includes an add tab 622 that, when selected, displays add from table button 623 and add from graph button 624. In response to selection of the add from tables button 623, the system updates the custom code list to include any items selected in the code search panel 610. In response to selection of the add from graph button 624, the system updates the custom code list to include all items associated with one or more selected nodes in the code visualization panel 630. To remove items from the custom code list, the user may select a remove codes tab 625, which cause the buttons 623 and 624 to be replaced with remove from table button and remove from graph buttons, which respectively remove selected items in the table (and their corresponding nodes in the graph) and remove all items in the graph (and their corresponding nodes in the table).

The user interface 600 also includes an export code list item 642 that allows the user to save and/or export the custom code list in one or more formats. In some embodiments, the custom code list is tagged with information regarding creation of the custom list that is stored as part of, or in association with, the custom code list when it is saved and/or exported. Thus, future users of the custom code list may view information regarding creation of the custom code list to potentially identify whether the code list is appropriate for their purposes, whether the custom code list is updated, etc. The code list creation data may include items such as an identifier of the code list creator, creation time, queries that were used in generating custom code list, and the like.

Alerts and Notification

In some embodiments, the code list building system 100 may provide alerts and/or other notifications to entities having an interest in generation and/or updates to custom code lists. For example, an alert may provide a real-time notice to a client (e.g., via client device 130 of FIG. 1) that a custom code list has been updated, such as by another user of the user device. Thus, a client could receive an alert indicating that a particular custom code list (e.g., an updated or entirely new custom code list) is available for immediate use. Alerts may be transmitted to the user device 110 and/or other device also, such as alerts indicating that changes have been made to code lists used in custom code lists associated with the user or alerts indicating that new code lists or relationship mappings are available.

In some embodiments, alerts may be automatically transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Example Computing System Architecture and Operation

Figure 7:
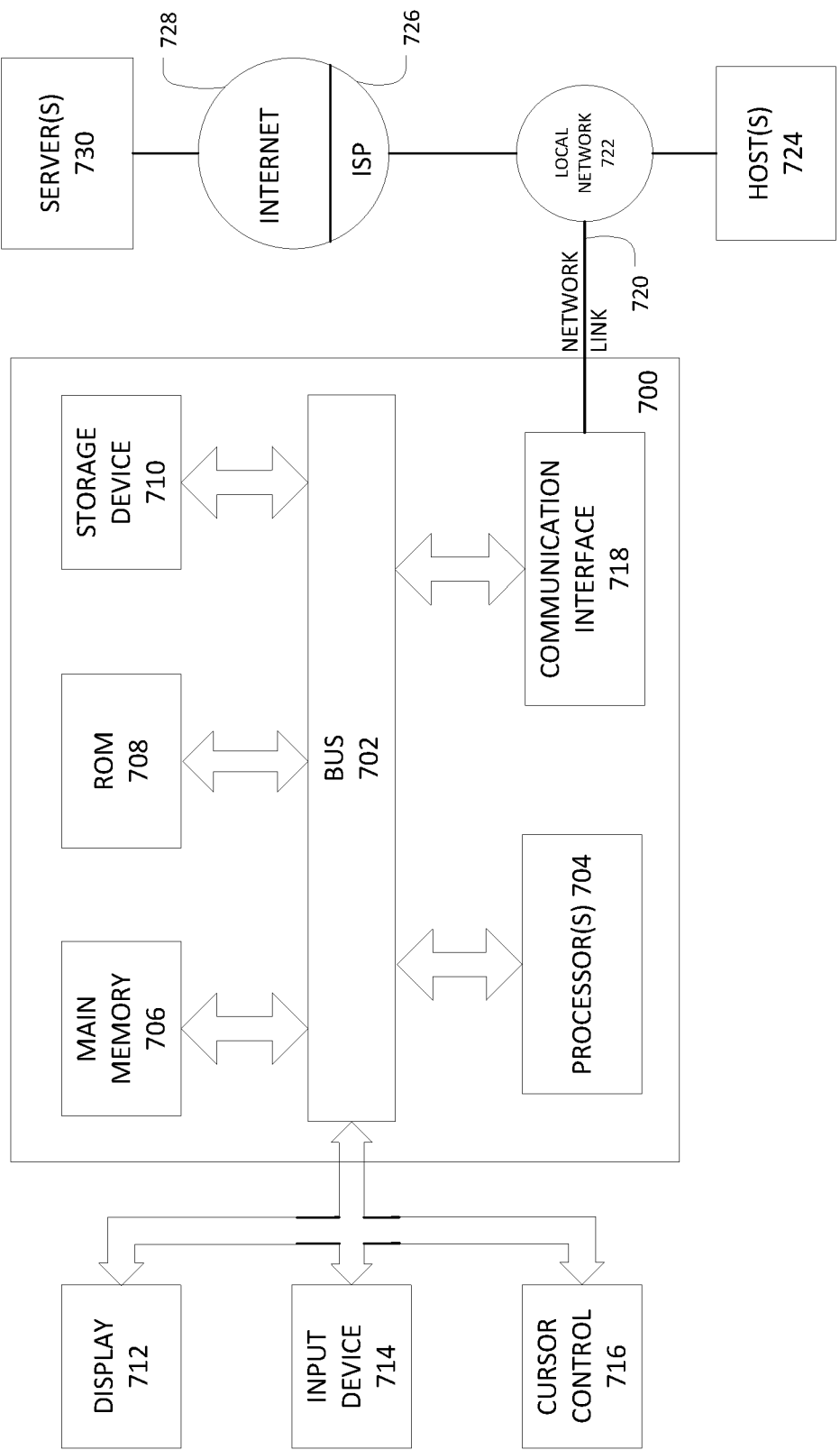
FIG. 7 illustrates a computer system with which certain methods discussed herein may be implemented.

FIG. 7 illustrates a computer system with which certain methods discussed herein may be implemented. For example, the code list building system 100, the user device 110, and/or the client device 120 may include some, all, or additional components as discussed below with reference to system 700.

Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 106, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:
   causing display of an interactive user interface concurrently displaying at least a code search panel, a code visualization panel, and a custom code panel;
   accessing a first code list including a plurality of first items, each first item comprising a diagnostic code;
   accessing a second code list including a second plurality of second items, each second item comprising a diagnostic code, wherein at least a first human recognizable concept is associated with each of a first item and a second item having different diagnostic codes;
   determining one or more matching items of the first items and of the second items that match a query;
   determining relationships between respective matching items;
   updating the interactive user interface to indicate, in the code visualization panel, a visual representation of at least first matching items including a first diagnostic code from the first code list and a second diagnostic code from the second code list and relationships between the matching items;
   receiving, via a user input in the code visualization panel, a selection of a visual representation of a matching item;
   determining a code from one or more of the first code list and the second code list that are mapped to the selected matching item; and
   updating the custom code panel to indicate a custom code list including at least the determined code mapped to the selected matching item.

2. The method of claim 1, further comprising:
   exporting the custom code list, wherein the custom code list is usable to identify records in a third-party database associated with any of the matching items in the custom code list.

3. The method of claim 1, wherein relationships indicate different codes that are each mapped to a same or similar human recognizable concept.

4. The method of claim 1, wherein the interactive user interface further comprises a control to add a selected subset of matching items to the custom code list.

5. A computing system comprising:
   a hardware computer processor;
   a non-transitory computer readable medium having software instructions stored thereon, the software instructions executable by the hardware computer processor to cause the computing system to perform operations comprising:

causing display of an interactive user interface concurrently displaying at least a code search panel, a code visualization panel, and a custom code panel;

accessing a first code list including a plurality of first items, each first item comprising a diagnostic code;

accessing a second code list including a second plurality of second items, each second item comprising a diagnostic code, wherein at least a first human recognizable concept is associated with each of a first item and a second item having different diagnostic codes;

determining one or more matching items of the first items and of the second items that match a query;

determining relationships between respective matching items;

updating the interactive user interface to indicate, in the code visualization panel, a visual representation of at least first matching items including a first diagnostic code from the first code list and a second diagnostic code from the second code list and relationships between the matching items;

receiving, via a user input in the code visualization panel, a selection of a visual representation of a matching item;

determining a code from one or more of the first code list and the second code list that are mapped to the selected matching item; and updating the custom code panel to indicate a custom code list including at least the determined code mapped to the selected matching item.

6. The computing system of claim 5, wherein the operations further comprise:

exporting the custom code list, wherein the custom code list is usable to identify records in a third-party database associated with any of the matching items in the custom code list.

7. The computing system of claim 5, wherein relationships indicate different codes that are each mapped to a same or similar human recognizable concept.

8. The computing system of claim 5, wherein the interactive user interface further comprises a control to add a selected subset of matching items to the custom code list.

* * * * *